United States Patent
Stitt et al.

(10) Patent No.: US 9,533,837 B2
(45) Date of Patent: Jan. 3, 2017

(54) ARTICLE CARRIER APPARATUS

(71) Applicant: Compac Technologies Limited, Auckland (NZ)

(72) Inventors: Andrew Stitt, Auckland (NZ); Lee Adrian Cook, Auckland (NZ); Jonathon Patrick Jackson, Auckland (NZ)

(73) Assignee: Compac Technologies Limited, Auckland (NZ)

( * ) Notice: Subject to any disclaimer, the term of this patent is extended or adjusted under 35 U.S.C. 154(b) by 0 days.

(21) Appl. No.: 14/576,003

(22) Filed: Dec. 18, 2014

(65) Prior Publication Data

US 2016/0176655 A1    Jun. 23, 2016

(51) Int. Cl.
| | | |
|---|---|---|
| B65G 47/50 | (2006.01) |
| B65G 47/46 | (2006.01) |
| B65G 47/82 | (2006.01) |
| B65G 47/76 | (2006.01) |
| B65G 47/71 | (2006.01) |

(52) U.S. Cl.
CPC ............. *B65G 47/766* (2013.01); *B65G 47/71* (2013.01)

(58) Field of Classification Search
CPC ........ B65G 47/50; B65G 47/46; B65G 47/82; B65G 47/5109; B65G 47/5113; B65G 47/5118
USPC ........ 198/347.4, 367, 367.1, 367.2; 700/216, 700/217, 218, 229, 230
See application file for complete search history.

(56) References Cited

U.S. PATENT DOCUMENTS

| | | | | | |
|---|---|---|---|---|---|
| 3,153,487 | A | * | 10/1964 | Hoellen | B65G 1/1371 186/55 |
| 5,007,521 | A | * | 4/1991 | Tanaka | B65G 1/1378 198/347.1 |
| 5,308,001 | A | * | 5/1994 | Grecksch | D01H 9/187 198/347.4 |
| 5,887,699 | A | * | 3/1999 | Tharpe | B07C 3/065 198/367 |
| 6,464,065 | B2 | * | 10/2002 | Herubel | B65G 47/682 198/347.4 |
| 6,811,017 | B1 | * | 11/2004 | Gross | A01K 43/00 198/446 |
| 7,128,217 | B2 | * | 10/2006 | Henry | A21C 15/00 198/418.7 |
| 8,035,053 | B2 | * | 10/2011 | Skrdlant | B07C 3/08 198/367.1 |
| 8,087,509 | B2 | * | 1/2012 | Schmid | B65B 35/44 198/444 |
| 8,612,050 | B2 | * | 12/2013 | Lee | B65B 35/44 198/411 |

(Continued)

*Primary Examiner* — Douglas Hess
(74) *Attorney, Agent, or Firm* — Lowe Graham Jones PLLC

(57) ABSTRACT

The present subject matter relates to article carriers for use in grading apparatus and in particular, but not exclusively, for use in grading fruit. The present subject matter provides an article carrying apparatus comprising a plurality of carrier lanes each for receiving and conveying a number of articles; one or more diverters arranged to control the distribution of received articles into the lanes; a sensor arranged to determine a capacity use parameter for each lane; and a controller arranged to control the position of each diverter dependent on a difference between combined determined capacity use parameters and combined target capacity use parameters for lanes to one side of said diverter.

16 Claims, 12 Drawing Sheets

(56) References Cited

U.S. PATENT DOCUMENTS

| | | | |
|---|---|---|---|
| 8,839,946 B2* | 9/2014 | Grootherder | B65G 47/71 198/436 |
| 8,851,266 B2* | 10/2014 | Liu | B65G 47/647 198/347.4 |
| 9,186,706 B2* | 11/2015 | Van Haaster | B07C 5/36 |
| 2011/0180368 A1 | 7/2011 | Rockstead | |
| 2014/0142747 A1* | 5/2014 | Magato et al. | |
| 2015/0101908 A1* | 4/2015 | Cook et al. | |

* cited by examiner

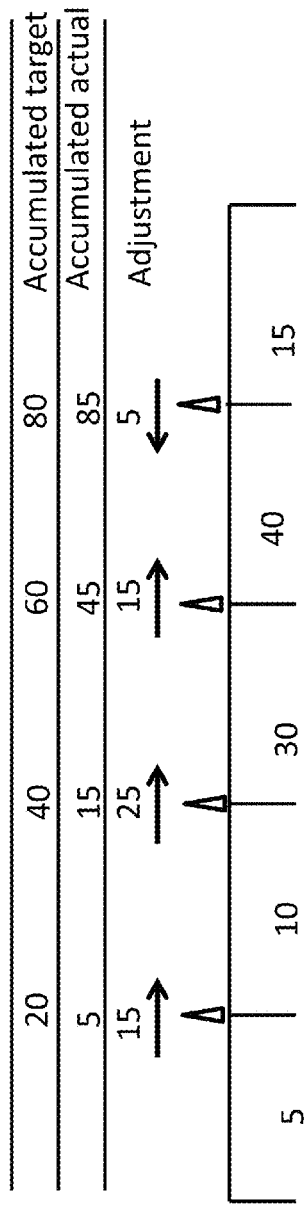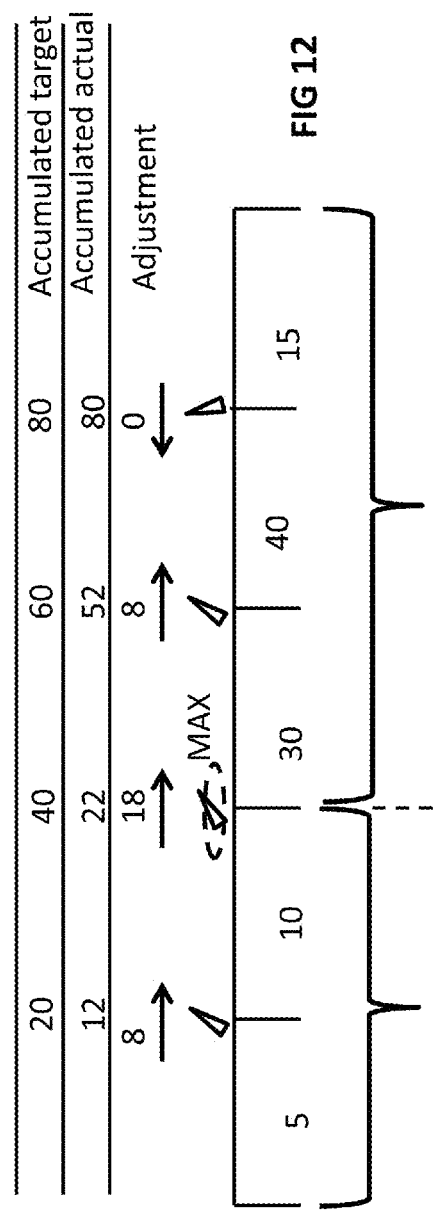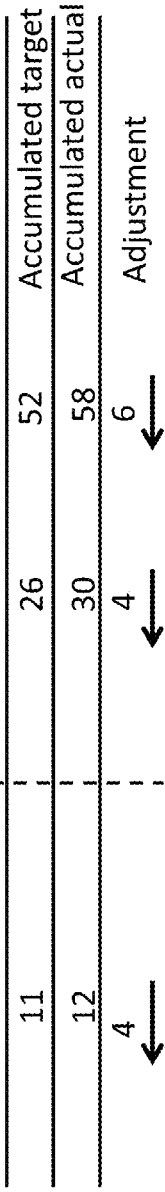
FIG 12

ARTICLE CARRIER APPARATUS

FIELD OF THE INVENTION

The present subject matter relates to article carriers for use in grading apparatus and in particular, but not exclusively, for use in grading fruit.

BACKGROUND OF THE INVENTION

Processing lines for articles such as fruit often require different quality articles to be separated. This is an important commercial function, which may be used for example, to distinguish between fruit destined for export and fruit destined for the local market. Manually grading articles is costly, slow and prone to inaccuracies. Thus, automated methods and apparatus for grading articles have been developed. Known sorters can grade and sort produce by weight, color, blemish, dimensions, shape, density, internal taste/quality, etc.

The use of one or more video cameras is one known method of automatically sensing characteristics of articles. For example, the method and apparatus described in U.S. Pat. No. 4,825,068, the disclosure of which is incorporated herein by reference, uses a video camera in conjunction with mirrors to obtain a picture of each article as it travels past the line of sight of the mirrors. The mirrors enable a larger portion of the article, which is typically generally spherically shaped, to be simultaneously viewed by the camera.

Article carriers are used to transport articles such as fruit through various measurement stages for grading purposes and to eject fruit at a required location dependent on the result of the grading process. Such article carriers usually include an endless circuit of carriers or cups on a conveyor chain with the cup situated to unload fruit at one of a plurality of stations. There is also often a requirement to carry large numbers of incoming fruit using a plurality of parallel carriers. Typically such article carrier apparatus having multiple conveyor chains or belts are arranged to receive individual fruit articles into respective cups, the fruit being delivered on an adjacent infeed shelf.

The infeed shelf receives fruit and is typically inclined downwardly towards the plurality of article carriers, and may narrow in order to concentrate received fruit towards the article carriers. Some infeed shelves incorporate diverters which are typically blunt protrusions extending perpendicularly from the infeed shelve and angled to guide the fruit articles towards the incoming cups of the article conveyor chain. The diverters may also be used to balance the numbers of fruit directed to each article carrier to ensure high capacity carriage on each of the article carriers, for example, by ensuring that sufficient numbers of fruit articles are delivered to the article carriers at the outer ends of the parallel article carriers. The diverters are typically fixed and may be integral with the infeed shelf, however manual alignment or angling of the diverters may be provided in some infeed shelves.

Throughout this specification, any reference to items of prior art is in no way to be deemed as an admission that such prior art constitutes part of the common general knowledge.

SUMMARY OF THE INVENTION

In one aspect there is provided an article carrying apparatus comprising a plurality of parallel carrier lanes each for receiving and conveying a number of articles, a number of diverters each located between receiving ends of respective carrier lanes and arranged to control the distribution of received articles into the lanes, and one or more sensors arranged to determine a capacity use parameter for each lane. The apparatus further comprises a controller arranged to control the position of a diverter dependent on a difference between combined determined capacity use parameters and combined target capacity use parameters for lanes to one side of the diverter.

In a second aspect there is provided a controller for an item carrying apparatus having: a plurality of parallel carrier lanes each for receiving and conveying a number of articles; a number of diverters each located between receiving ends of respective carrier lanes and arranged to control the distribution of received articles into the lanes; one or more sensors arranged to determine a capacity use parameter for each lane; the controller arranged to control the position of a diverter dependent on a difference between combined determined capacity use parameters and combined target capacity use parameters for lanes to one side of the diverter.

In a third aspect there is provided a method of operating an article carrying apparatus comprising: a plurality of parallel carrier lanes each for receiving and conveying a number of articles; a number of diverters each located between receiving ends of respective carrier lanes and arranged to control the distribution of received articles into the lanes; one or more sensors; the method comprising: determining a capacity use parameter for each lane using the sensors; controlling the position of a diverter dependent on a difference between combined determined capacity use parameters and combined target capacity use parameters for lanes to one side of the diverter.

Embodiments, controllers and methods corresponding to the above apparatus are also provided.

In another aspect there is provided a computer program product which when implemented on a computer causes the computer to execute the above defined methods.

The invention may also be described broadly to consist in the parts, elements and features referred to or integrated in the specification of the application, individually or collectively, in any or all combinations of two or more of the parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will be become apparent to those skilled in the art upon reading of the following description which provides at least one example of a practical application of the invention.

BRIEF DESCRIPTION OF THE DRAWINGS

Embodiments of the invention will now be described with reference to the accompanying drawings, by way of example only and without intending to be limiting, in which:

FIG. 12 is a schematic illustrating operation of the further embodiment.

DETAILED DESCRIPTION

Figure 1:
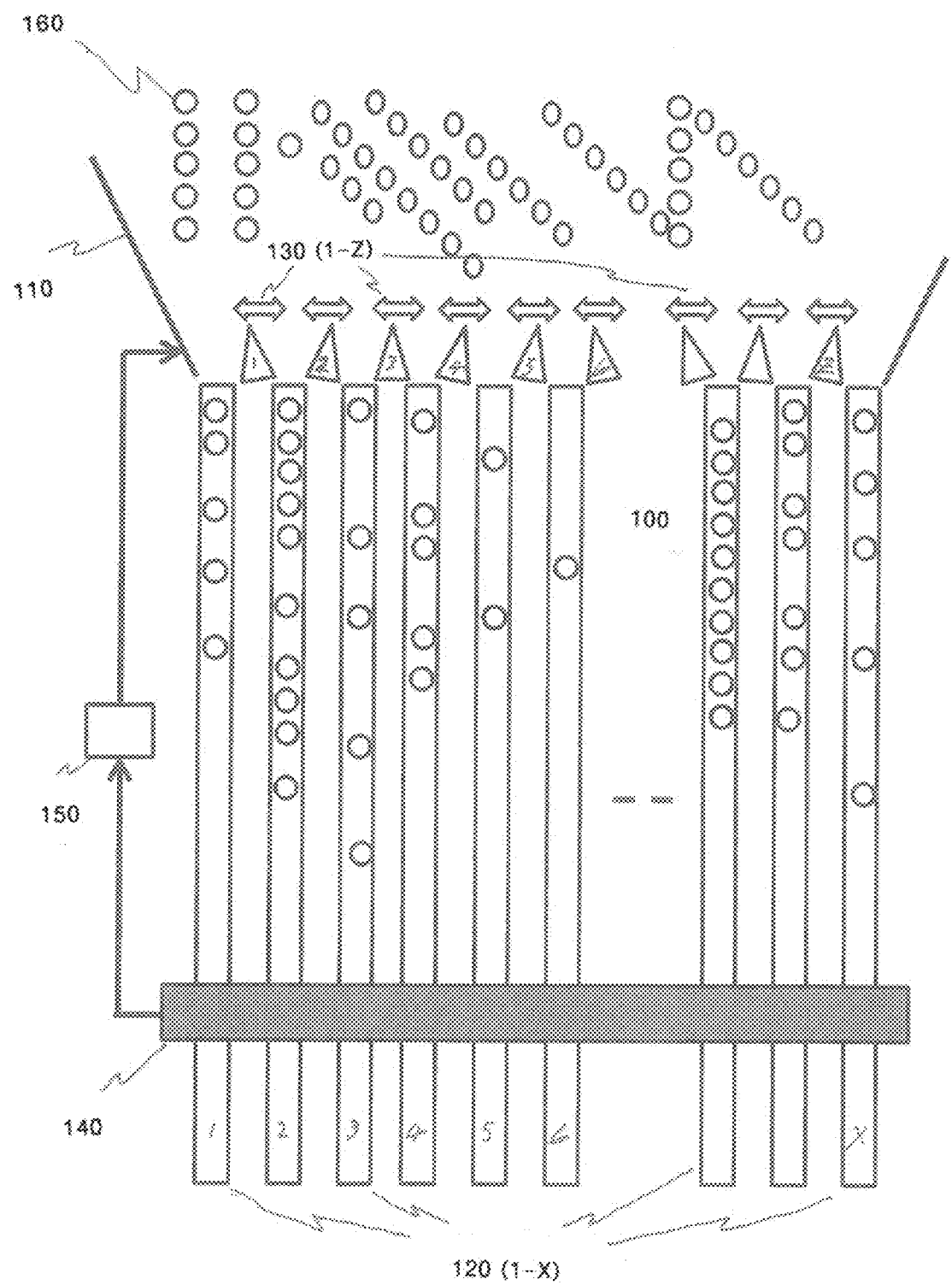
FIG. 1 shows a plan view of an article carrier apparatus according to an embodiment.

An article carrier apparatus according to an embodiment is shown in plan view in FIG. 1. The article carrier apparatus 100 comprises a plurality of carrier lanes 120 (1-$x$) for receiving and carrying a number of articles 160. The carrier lanes may each comprise an endless chain loop of cups each for receiving and carrying a respective article such as an item of fruit. Alternatively, the carrier lanes may comprise an endless belt loop sufficiently narrow to receive one fruit at a time. The carrier lanes 120 are arranged in parallel although alternative embodiments may provide for different relative arrangements of the carrier lanes. The carrier lanes receive fruit such as cherries or other food articles 160 from one or more infeed tray 110. The infeed tray 110 is typically sloping down towards the carrier lanes 120 and may narrow in order to direct the articles 160 towards the carrier lane cups or continuous belt. The infeed tray 110 receives fruit or other articles 160 from a coupled apparatus such as a fruit washer. The plurality of carrier lanes 120 carry the articles 160 either to another article processing apparatus, or to other carrier lanes or shutes according to a sorting assessment of the respective articles based for example on size, color, number of blemishes etc.

Those skilled in the art will appreciate that the cups of the carrier lanes are individually controllable to divert their respective food article into an appropriate sorting lane or shute. The sorting is typically carried out using an automatic sorter 140 which might use video cameras to monitor passing articles in order to determine size, shape, color, blemishes, and other parameters which can then be used to sort the respective fruit article. A known automatic sorter is described in international PCT patent application WO 2010/008303, the content of which is hereby incorporated by reference. The output from the automatic sorter or sensor 140 can then be used to control the respective carrier lanes in order to deliver fruit to appropriate downstream sorting channels.

In order to maximize throughput of fruit articles 160, it has been recognized that the fruit arriving on the infeed tray 110 should be distributed as evenly as possible across the carrier lanes 120 in order to maximize the capacity usage of each carrier lane 120. In other words it is desired for example to avoid fruit bunching near the middle carrier lanes whilst very little fruit is delivered to the outer lanes resulting in high capacity usage at the middle lanes but low capacity usage at the outer lane. In order to achieve a more even distribution of fruit to the carrier lanes, the article carrier apparatus comprises a number of diverters 130 (1-$z$) arranged to control the distribution of fruit to the carrier lanes 120. The diverters 130 shown in the embodiment are located adjacent and between respective carrier lanes 120. In alternative embodiments, different diverter locations and numbers may be employed, for example between every second carrier lane or spaced further up the infeed tray 110. The diverters 130 (1-$z$) are individually controllable to rotate so that an input channel for a particular carrier lane 120 can be enlarged or restricted by adjusting the adjacent diverters in order to increase or reduce the flow of fruit to the carrier lane. By controlling all of the diverters 130 in the article carrier apparatus, the distribution of articles across the carrier lanes can be made more uniform, thus increasing the overall capacity of the article carrier apparatus.

The article carrier apparatus 100 further comprises a sensor 140 and a controller 150. The sensor 140 can be an automatic sorting device, for example as previously described. Such devices may incorporate cameras in order to monitor various aspects of each passing fruit article, for example size and color. In alternative embodiments a simpler sensor may simply monitor the percentage of cups holding a fruit article 160, or the number of fruit articles carried by each article carrier per unit time—this may be useful for example where the article carriers are continuous belts. The sensor 140 generates a capacity use parameter ($C_i$) for each lane. Where cup type article carriers are used, such a capacity use parameter is known as the cupfill of the lane as will be appreciated by those skilled in the art. The capacity use parameter ($C_i$) for each lane is then output to the controller 150 which uses this data to automatically control the position of each diverter 130. Thus for example some carrier lanes 120 having a high cupfill may have their adjacent diverters rotated inwardly to restrict the number of fruit 160 entering that lane, whereas other lanes may have their adjacent diverters rotated outwardly to increase the size of the input channel and hence of the number of fruit entering the lane in order to increase its cupfill.

Figure 2:
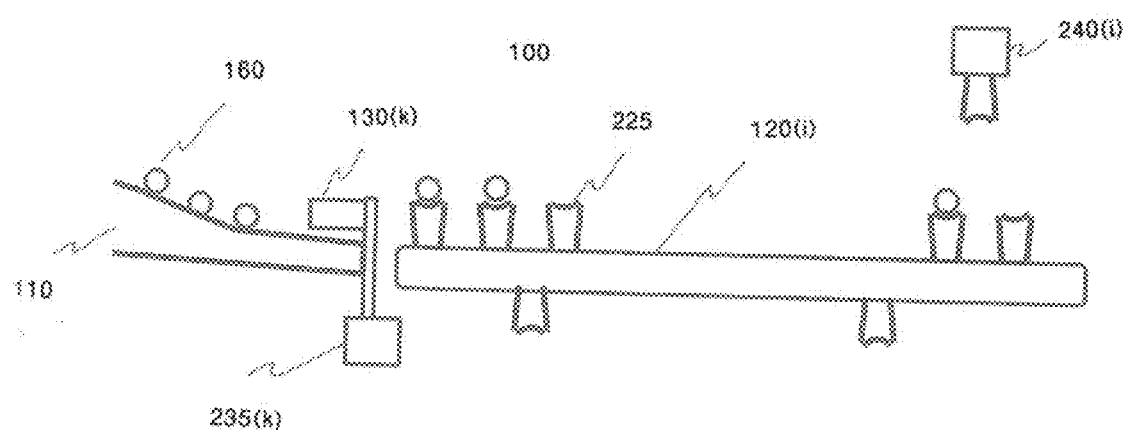
FIG. 2 shows a side view of an article carrier apparatus according to the embodiment of FIG. 1.

FIG. 2 shows a side view of the article carrier apparatus 100 of FIG. 1. A single carrier lane 120 ($i$) is shown which comprises a number of cups 225 for receiving the fruit articles 160. A camera 240 ($i$) forming part of the sensor 140 determines whether each cup carries an article 160. This information is used to determine the cupfill of the lane 120 ($i$) as could be appreciated by those skilled in the art. A diverter 130 ($k$) on one side of the lane 120 ($i$) is rotated by an actuator 235 ($k$) controlled by the controller 150. Similar actuators control the other diverters 130 (1-$z$). The controller 150 controls the individual diverters 130 according to a series of methods in order to more evenly distribute fruit articles across the carrier lanes.

Figure 3:
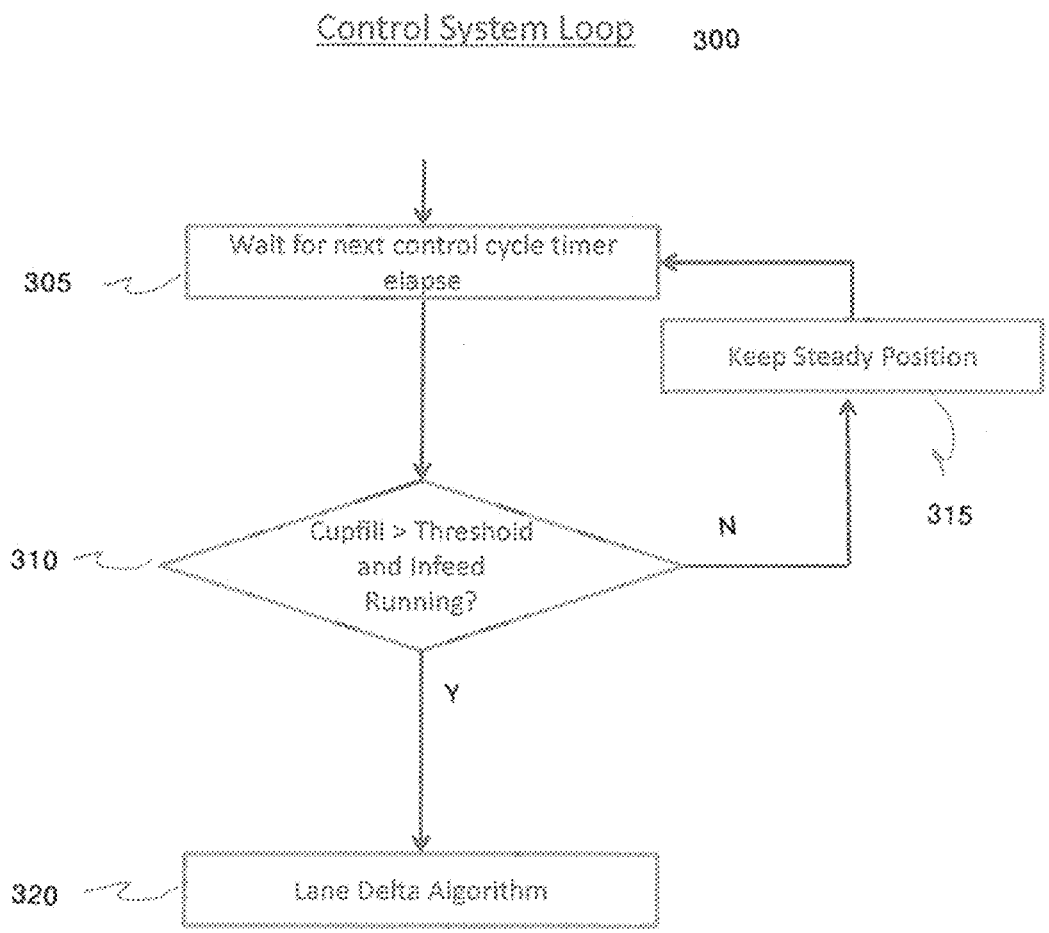
FIG. 3 is a flow chart of a control system loop method according to an embodiment.
Figure 4:
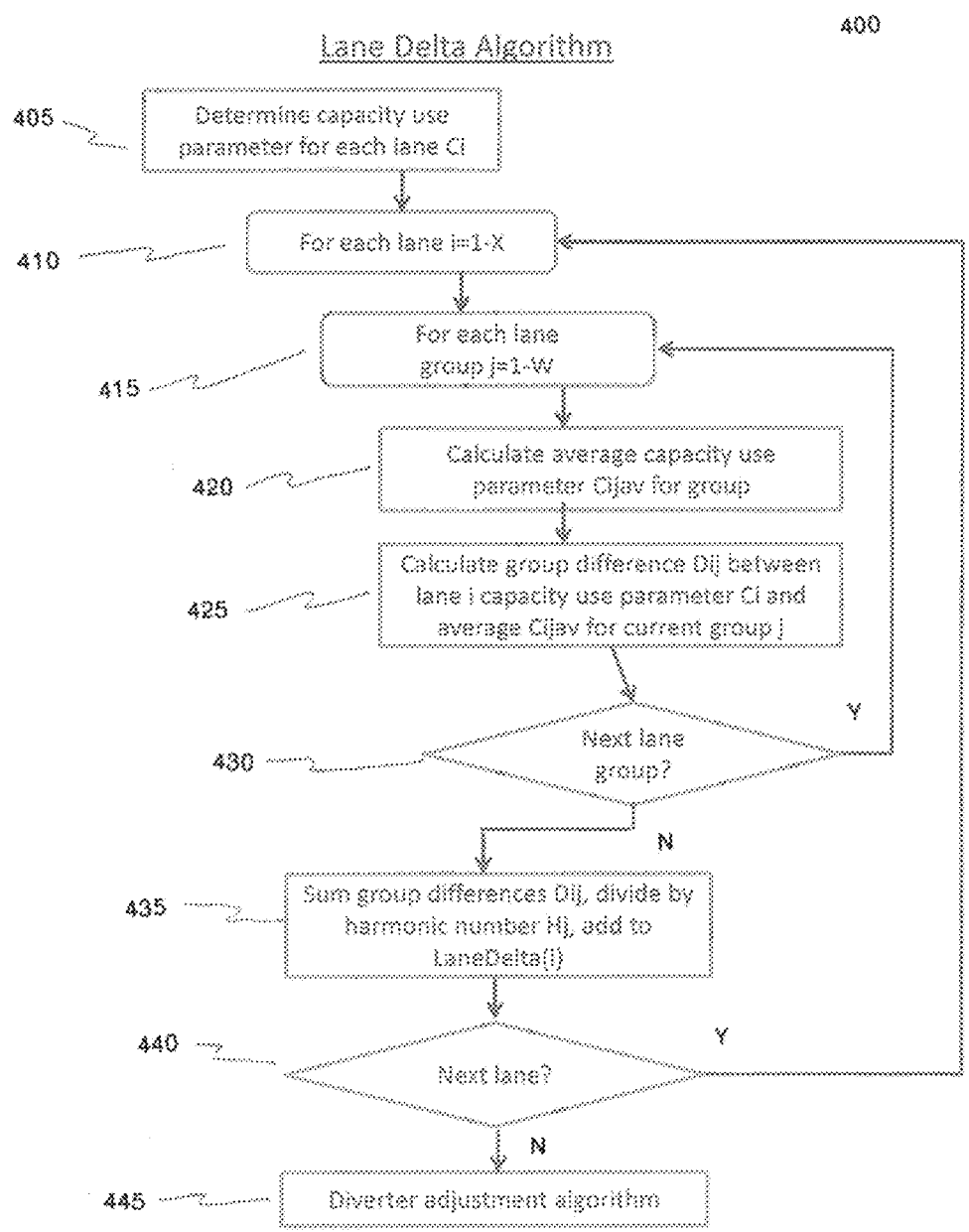
FIG. 4 is a flow chart of a lane delta method according to an embodiment.
Figure 5:
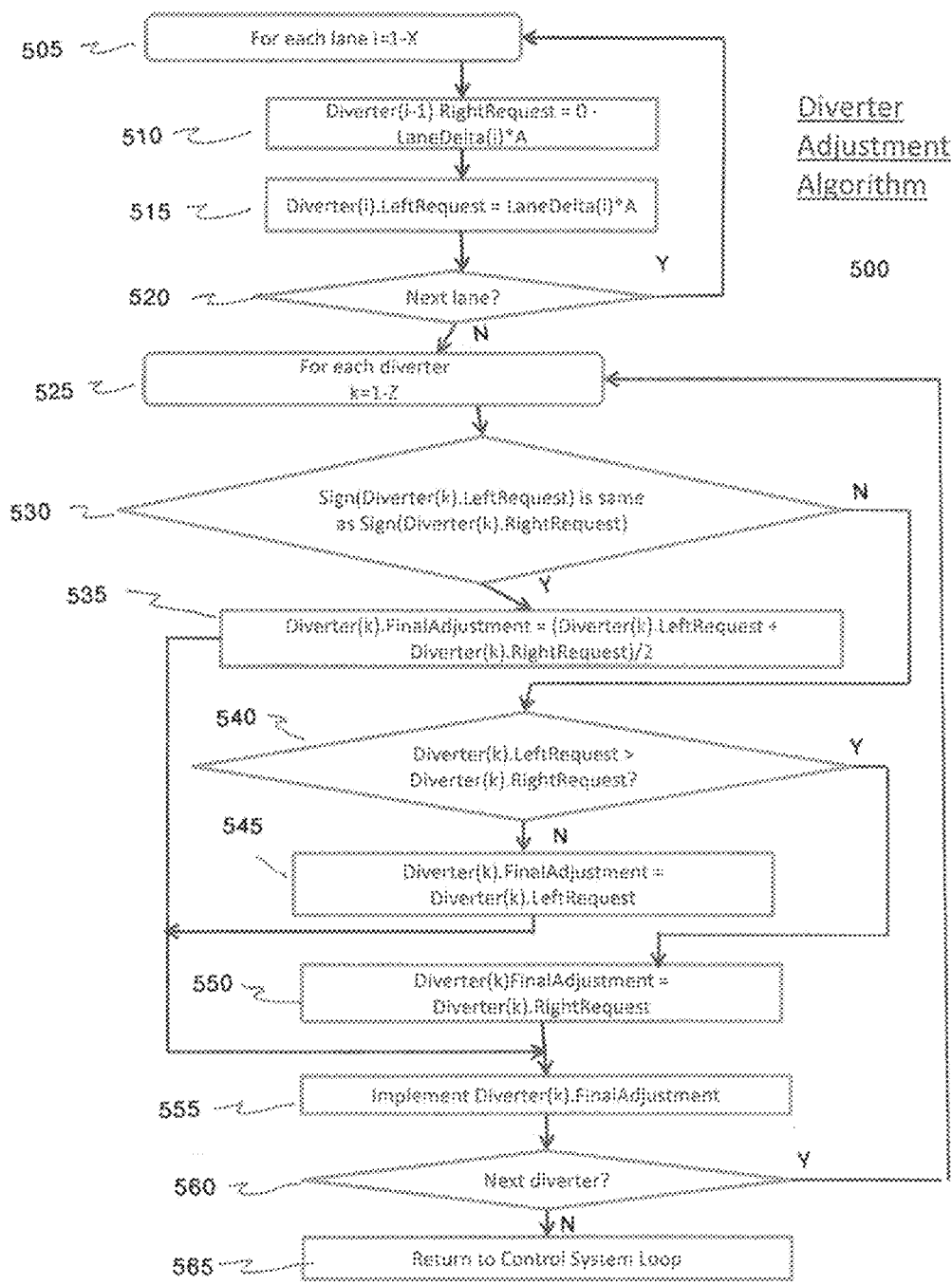
FIG. 5 is a flow chart of a diverter adjustment method according to an embodiment.

Methods according to embodiments are shown in FIGS. 3-5. Referring to FIG. 3, a flow chart for a control system loop method 300 is shown. At step 305, the control system loop method 300 waits for the next control cycle timer to elapse. A typical timer value is 30 seconds and provides that the dynamic fruit load of the article carrier apparatus is checked periodically. Once the current timer elapses, the method checks at step 310 whether the average cupfill of the parallel carrier lanes exceeds a threshold, and that the infeed is running. When the infeed is running, fruit or other articles are delivered to the infeed tray 110. If the average cupfill is below the threshold (for example 50%) or the infeed is not running, then the control system method maintains a steady position, indicated by step 315. In the steady position, the diverters remain in their previous positions, and the next timer is set before moving back to step 305. If at step 310, the average cupfill or other capacity use parameter ($C_i$) exceeds a threshold such as 50%, and the infeed is running (fruit is being fed on to the infeed tray 110), then the control system 150 moves to the lane delta method indicated by step 320. Such a state is indicative of high numbers of fruit being carried by the article carrier apparatus 100, and that it would benefit from even distribution of fruit across the lanes.

The lane delta method is shown in more detail in the flow chart of FIG. 4. The lane delta method 400 first determines a capacity use parameter (Ci) for each lane at step 405. In the embodiment of FIGS. 1 and 2, the capacity use parameter (Ci) is the cupfill which can be determined using the cameras of the sensor 140 (240). Then at step 410, the method 400 performs a number of steps to determine a lane adjustment parameter LaneDelta(j) for each of the carrier lanes (i=1-x). The LaneDelta for each lane corresponds to how much the input channel to the lane should increase or decrease in order to obtain a cupfill similar to those of adjacent lanes.

Figure 6:
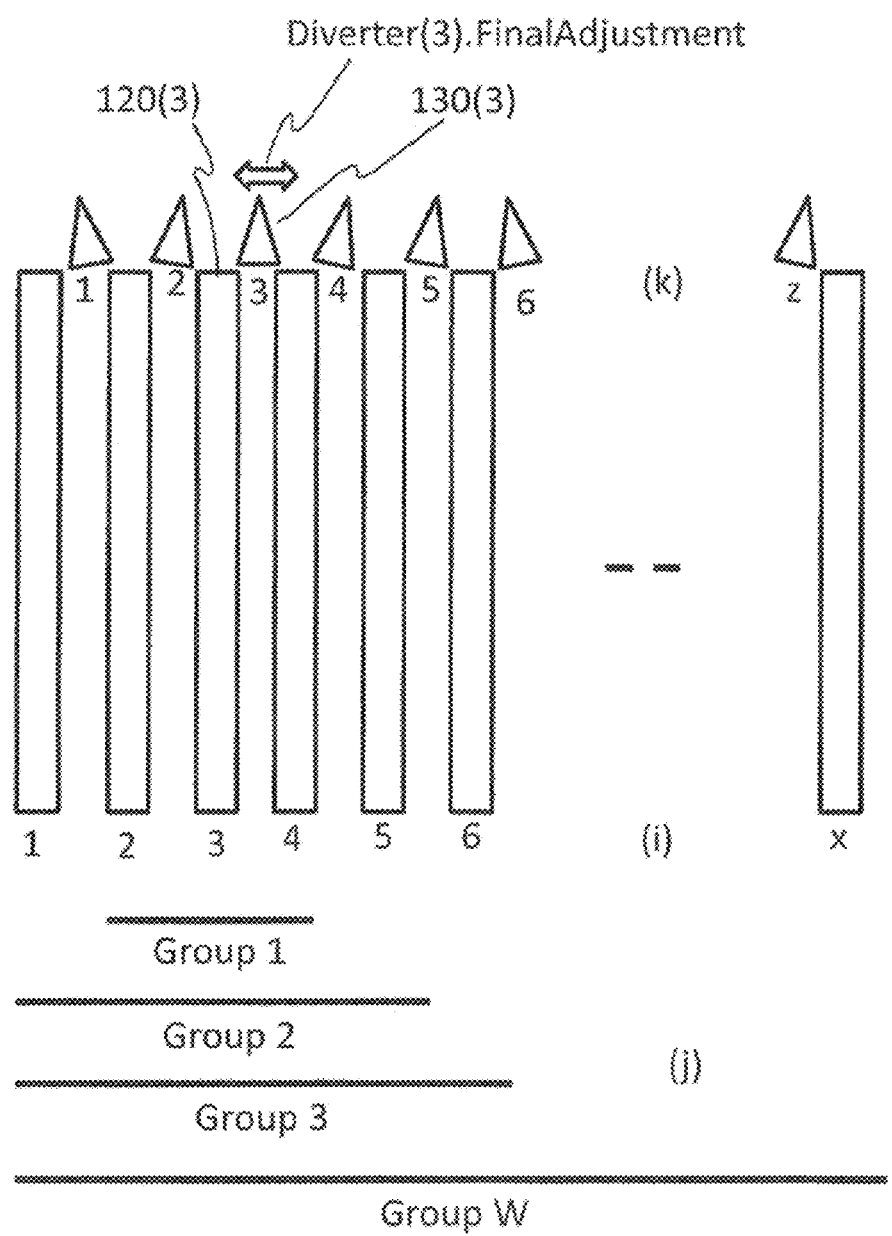
FIG. 6 is a schematic illustrating lane groups according to an embodiment.

In order to determine the LaneDelta(i) for each lane (i), groups (j) of adjacent lanes are analyzed for each lane (i) currently under consideration, as indicated by step 415. The allocation of lane groups (j) is illustrated schematically in FIG. 6. Taking as an example lane 120 (3) or i=3, a number of groups of adjacent lanes can be defined. Group 1 (j=1, and i=3) defines the smallest group of adjacent lanes comprising only the two immediately adjacent lanes 120 (2) and 120 (4). Larger group 2 (j=2 and i=3) includes two adjacent lanes on either side of the current lane of interest, the group comprising lanes 120 (1-5). The next largest group 3 (j=3 and i=3) extends to 3 adjacent lanes on each side where available. In this particular case because lane 1 is an outer lane only two adjacent lanes are available to the left of current lane i=3. Other lane groups may be defined up to a largest group W including all adjacent lanes. Although the groups have been defined as increasing one adjacent lane on each side, this is not necessary and other allocations of groups may alternatively be defined. Taking into account more and more distant adjacent lanes by grouping them as shown improves the stability and efficiency of the article distribution methods employed by the embodiments. Thus a method with more groups is typically more efficient at distributing fruit evenly across all of the carrier lanes and avoids "hunting" of the diverters.

Returning again to FIG. 4, for each of the defined lane groups j=1-w for each lane i=1-x, at step 420 the method calculates the average capacity use parameter (Cijav) for the current group. This parameter is simply the summation of for example the cupfill (Ci) for each of the lane carriers in the current group (j) divided by the number of lanes in the group. At step 425, the method 400 calculates a group difference parameter (Dij) between the capacity use parameter (Ci) of the current lane and the average (Cijav) for the current group (j). At step 430, the method determines whether there are further lane groups to process for the current lane, and if so returns to step 415. If all of the lane groups (j=1-w) for the current lane i have been completed, then the method 400 proceeds to step 435 where the group difference parameters (Dij) are summed. The sum of the group difference parameters is then divided by the jth harmonic number (Hj). The harmonic number is a known mathematical function which is the sum of the reciprocals of natural numbers up to the number j of lane groups employed. This results in a constant scaling factor where an increase in number of lanes has a lower influence. This value then becomes the lane adjustment parameter LaneDelta (i) for the current lane (i) under consideration. The LaneDelta (i) value of a lane is a parameter representing a desired adjustment in article capacity for the current lane; in order to more evenly distribute the articles across the apparatus 100. In an alternative embodiment, the LaneDelta(i) may be calculated by dividing each group difference parameter by the lane group number, i.e., LaneDelta(i)=Sum (Dij/j). This way the influence of lanes which are further away is reduced in a linear fashion with their distance—i.e., the further away lanes are (or the larger the lane group is) the less influence does it have when calculating the difference parameter.

At step 440, the method considers whether there are further lanes to process, and if so returns to step 410 where group processing of the next lane is carried out. If all lanes have been completed, the controller 150 moves on to a diverter adjustment method as indicated at step 445.

A diverter adjustment method according to an embodiment is shown in the flow chart of FIG. 5. The diverter adjustment method 500 receives adjustment requests for each diverter from the lane to its left and the lane to its right. In this embodiment the LaneDelta (i) values determined in the LaneDelta method of FIG. 4 are used, and correspond to lane adjustment parameters. These adjustment requests are compared in order to determine a final rotational adjustment for each diverter in order to best meet the requirements of each lane in the context of more evenly distributing fruit articles to all of the lanes of the article carrying apparatus.

The diverter adjustment method 500 according to the embodiment of FIG. 5 first determines adjustment requests for adjacent diverters of each lane starting at step 505. For each lane i=1-x, the method first determines a closing or right rotation adjustment for its associated left diverter according to:

$$\text{Diverter}(i-1)\cdot\text{RightRequest}=0-\text{LaneDelta}(i)*A.$$

A lower control value (Diverter(i-1)·RightRequest) requests movement of the diverter to the left and a higher value requests movement of the diverter to the right. These correspond respectively to requesting the diverter to open and close the input channel to the lane or the gap between the diverters either side of the lane entrance. The LaneDelta has been determined from the previous lane delta method 400, and A is a constant which can be optimized by experiment or simulation. In an embodiment the control valve corresponds to a percentage of the maximum diverter rotational range. Where the LaneDelta(i) is positive, this will result in a negative control value for the Diverter(i-1) RightRequest control valve which corresponds to a request to move the diverter to the left. For the embodiment of FIG. 1, the diverter number to the left of the lane is one less than the lane number, hence the use of (i-1) in the equation. Thus for example when processing lane i=2, the diverter to the left is diverter 1 (i.e., i-1), and the diverter to the right is diverter 2 (i.e., i)

At step 515, a request to the diverter right of the current lane (i) is also determined:

$$\text{Diverter}(i)\cdot\text{LeftRequest}=\text{LaneDelta}(i)*A.$$

If the LaneDelta value is positive, then this corresponds to a request to the right hand diverter of the lane to move left. The effect of these two steps 510 and 515 is that if the lane adjustment parameter for the current lane (LaneDelta(i)) is negative, then the right request for the left diverter (Diverter (i-1)·LeftRequest) is less than 0 (negative) thereby requesting the left diverter to move left. In addition the left request for the right diverter (Request(i)·RightDiverter) is larger than 0 (positive) which will request the right diverter to move right. The combined result is a request for a larger input channel or gap between left and right diverters for the current lane in order to allow more fruit articles to be received, thereby increasing its capacity use parameter. If the LaneDelta is positive (greater than 0) then the right request for the left diverter is larger than 0 causing a request for the left diverter to move right and if the left request for the RightDiverter is less than 0 (negative) this causes a request for the right diverter to move left. The combined result is a request for a smaller gap between the two diverters of the current lane in order to reduce the amount of fruit articles being received and hence reduces its capacity use parameter.

For end lanes where there is no left or right diverter, these steps are ignored by the method as would be understood by those skilled in the art. At step 520 the method 500 determines whether there are further lanes to consider and if so returns to step 505 so that left and right diverter request values (Diverter(i−1)·RightRequest and Diverter(i)·LeftRequest) can be determined for the next lane. Note that many of the diverters will receive adjustment requests from two adjacent lanes, on the left and right of the diverter. If all lanes have been processed, the method 500 proceeds to step 525 so that the various requests for moving each diverter can be considered and a final adjustment value settled upon for implementing movement of each diverter.

For each diverter k=1–z, the method determines a Diverter(k)·FinalAdjustment value which is dependent on the various adjustment request values from adjacent lanes and determined in the preceding steps. Each diverter (k) will have an adjustment request from the lane to its left (Diverter (k)·RightRequest) and the lane to its right (Diverter(k) ·LeftRequest). Different methods of combining these requests are used depending on whether the adjustment requests are in the same direction (e.g., rotate right) or opposite (e.g., one request to rotate left by a value and another request to rotate left by another value).

At step 530, for each diverter the method 500 determines whether the adjustment request values from each adjacent lane are for the same direction (i.e. whether the sign of the value for the left request and the right request from the adjacent lanes are the same).

If the requested adjustments are in the same direction (e.g. both left), the method moves to step 535 where a final adjustment value is arrived at which is the average of the two requests from the adjacent lanes:

Diverter(*k*)·FinalAdjustment=(Diverter(*k*)·LeftRequest+Diverter(*k*)·RightRequest)/2.

Using the average reduces hunting effects which might result from using one extreme adjustment request for example.

If however the signs are different, in other words one lane is requesting the diverter to move right and the other lane is requesting the diverter to move left, then the method moves to step 540 which determines which request value is larger. The method uses the larger of the two request values. Thus if Diverter(k)·LeftRequest is greater than Diverter(k)·RightRequest, then the method moves to step 550 where the Diverter(k)·FinalAdjustment is allocated the Diverter (k)·LeftRequest value. If this is not the case, then the Diverter(k)·FinalAdjustment variable is assigned the Diverter (k)·RightRequest value at step 545. In an alternative embodiment, the difference between the two adjustment requests could be used.

The method then moves to step 555 where the Diverter (k)·Final Adjustment value assigned is implemented for the current diverter 130(*k*) using its respective actuator 235 (*k*). At step 560, the method 500 determines whether further diverters require processing and if so returns to step 525 for the next diverter. If all diverters have been completed, then the method moves to step 565 which represents a return to the control system loop method of FIG. 3.

Although the above methods have been described in order to implement automatic control of diverter positions dependant on the lane capacity use parameters, variations on the various parameters used, the assignment of values or the equations could alternatively be used. For example different diverter positions could be utilized which are not adjacent the carrier lanes, and may not be provided between the carrier lanes. Furthermore a different arrangement of carrier lane groups may be employed, including not using such groups at all. Different ways in which requests from left and right lanes may be combined to generate movement in a corresponding diverter could alternatively be used. In a further arrangement the diverter adjustment method 500 or the lane delta method 400 may be combined with a different lane delta or diverter adjustment method respectively.

Figure 7:
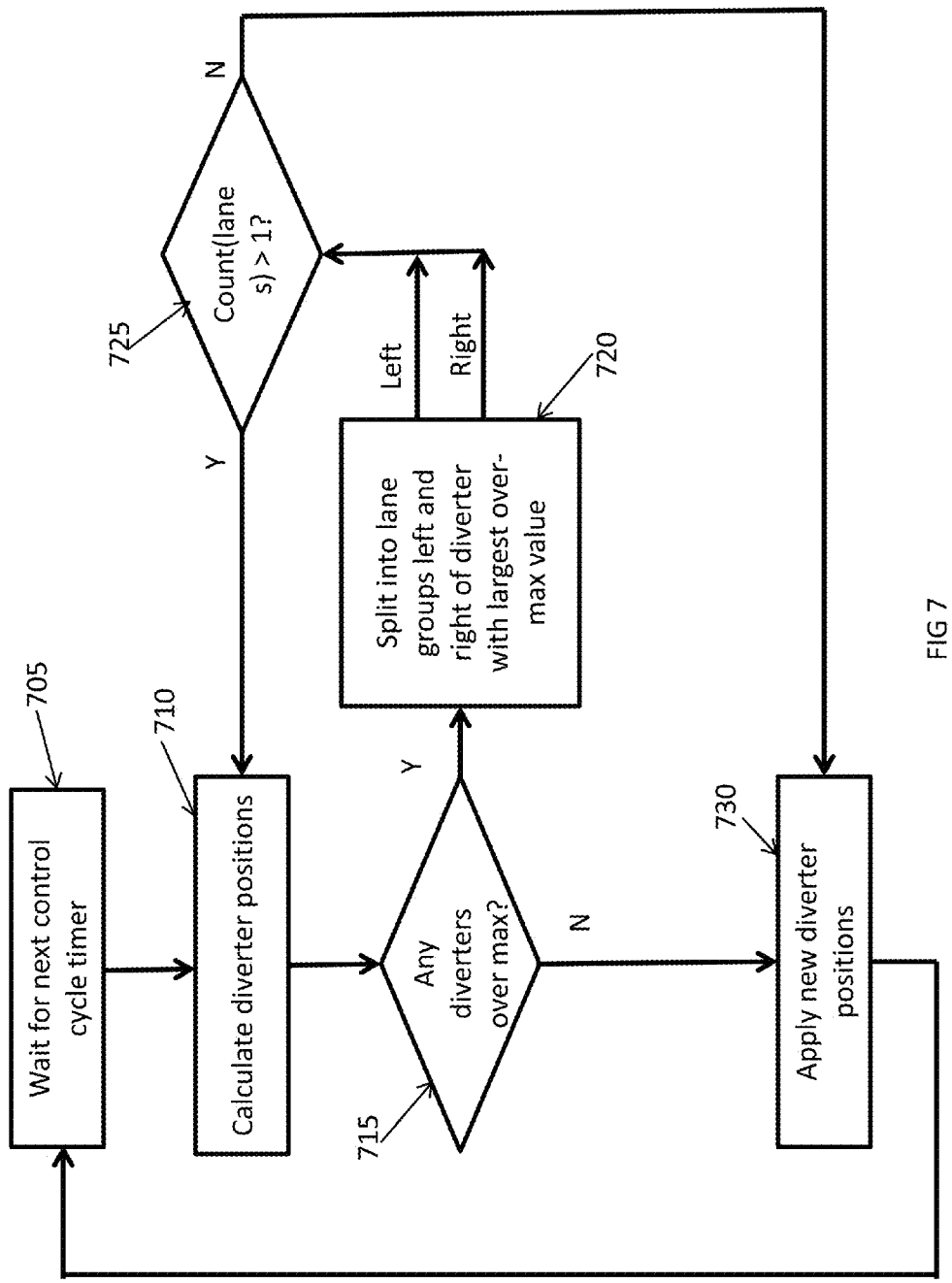
FIG. 7 is a flow chart of a control system loop method according to a further embodiment.
Figure 8:
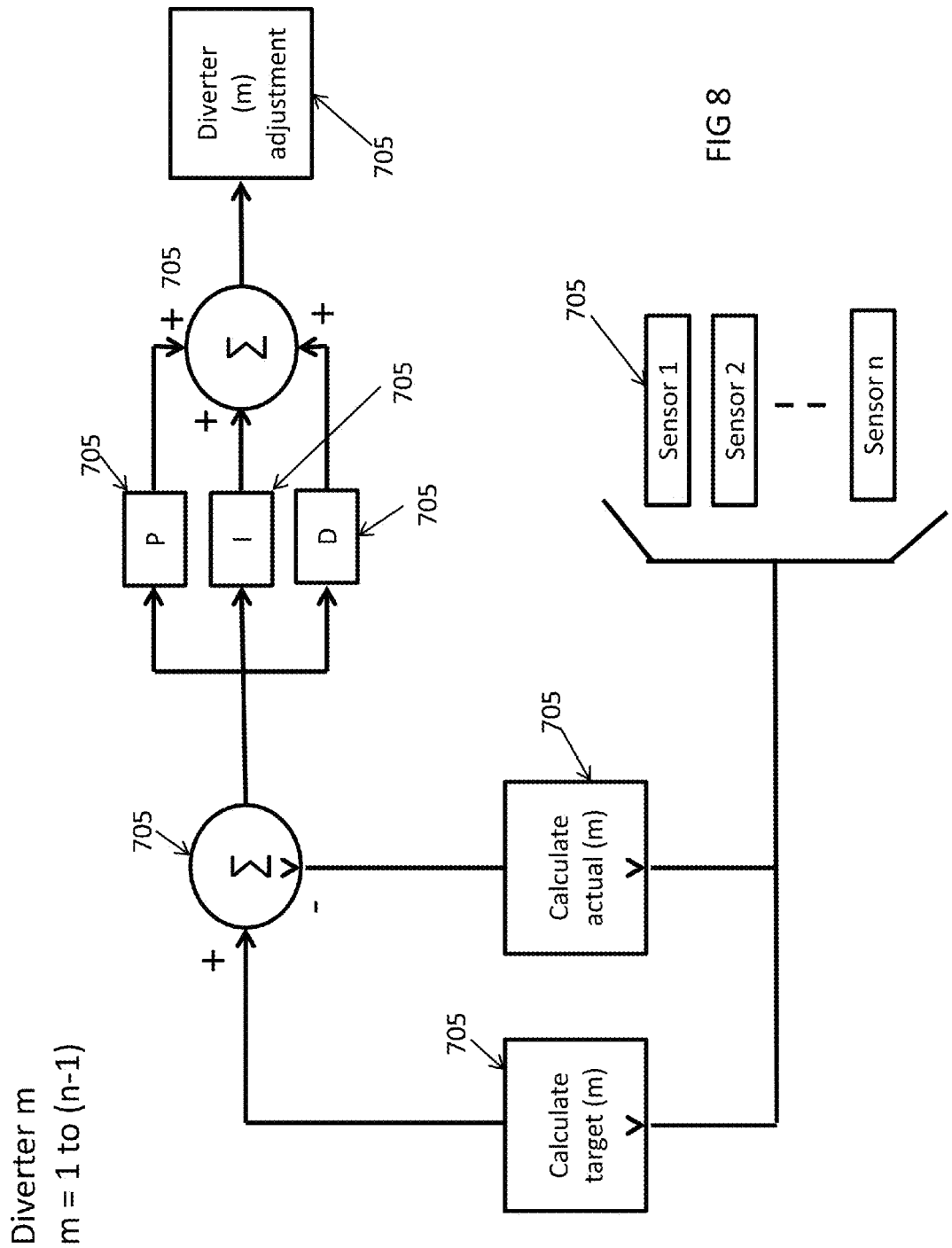
FIG. 8 is a flow chart of a diverter adjustment control method according to the further embodiment.
Figure 9:
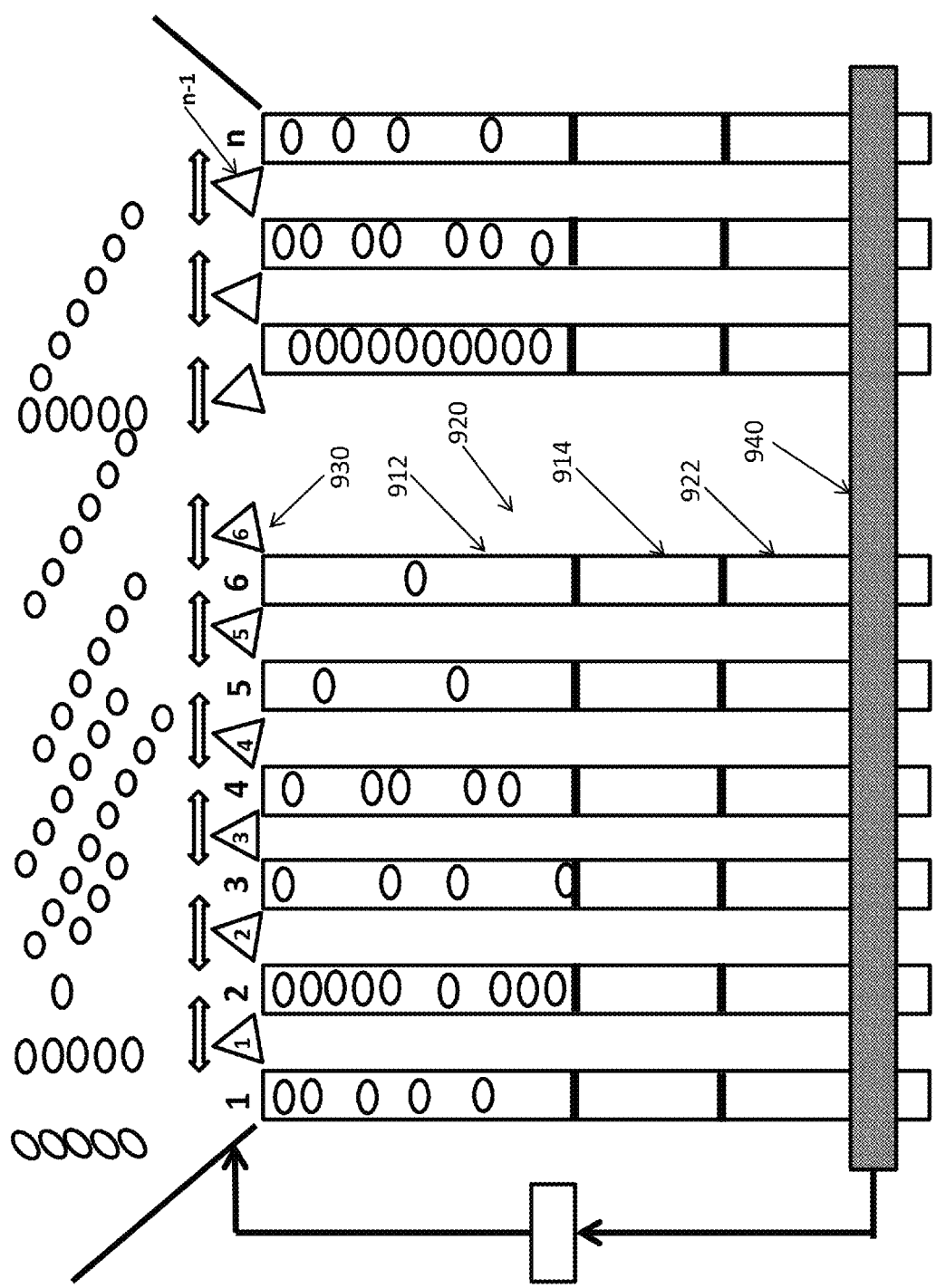
FIG. 9 shows a plan view of an article carrier apparatus according to a further embodiment.

Another embodiment is described with respect to FIGS. 7-12 which illustrate an article carrying apparatus for use with fruit such as cherries and the like. A plan view of the apparatus 900 is shown in FIG. 9 and which is similar to the apparatus 100 of FIG. 1. The apparatus 900 comprises a plurality of parallel carrier lanes 920 for receiving and carrying a number of articles such as cherries or other fruit or vegetables. In this embodiment the carrier lanes 920 comprise sections including a singulation apparatus 912 which effectively funnels the incoming articles into a single line and transfers these on to a load belt 914. One or more load belts may in practice be used. The load belt 914 transfers the articles into respective cups or partitions in an article carrier 922. The individual articles are then carried to a sensor 940 such as an array of cameras for determining various characteristics of each article so that it may be sorted downstream of the sensor 940. Further details of this processing can be found in the description related to FIG. 1. As also there described, the sensor 940 can be used to determine various capacity use parameters such as cup fill rate or article count over a predetermined time period.

A diverter 930 is located between the entrance of each carrier lane 920. Although in this embodiment a controllable diverter is location between each lane, in other embodiments a combination of fixed and controllable diverters could alternatively be used, diverters may be omitted from between some lanes, or the diverters may be arranged further forward of the lane entrances for example in an array or line. The diverters are controlled together in order to more evenly distribute the incoming articles between the parallel carrier lanes. This is similar to the process previously described, although the control method is different and will be described in more detail below.

Figure 10:
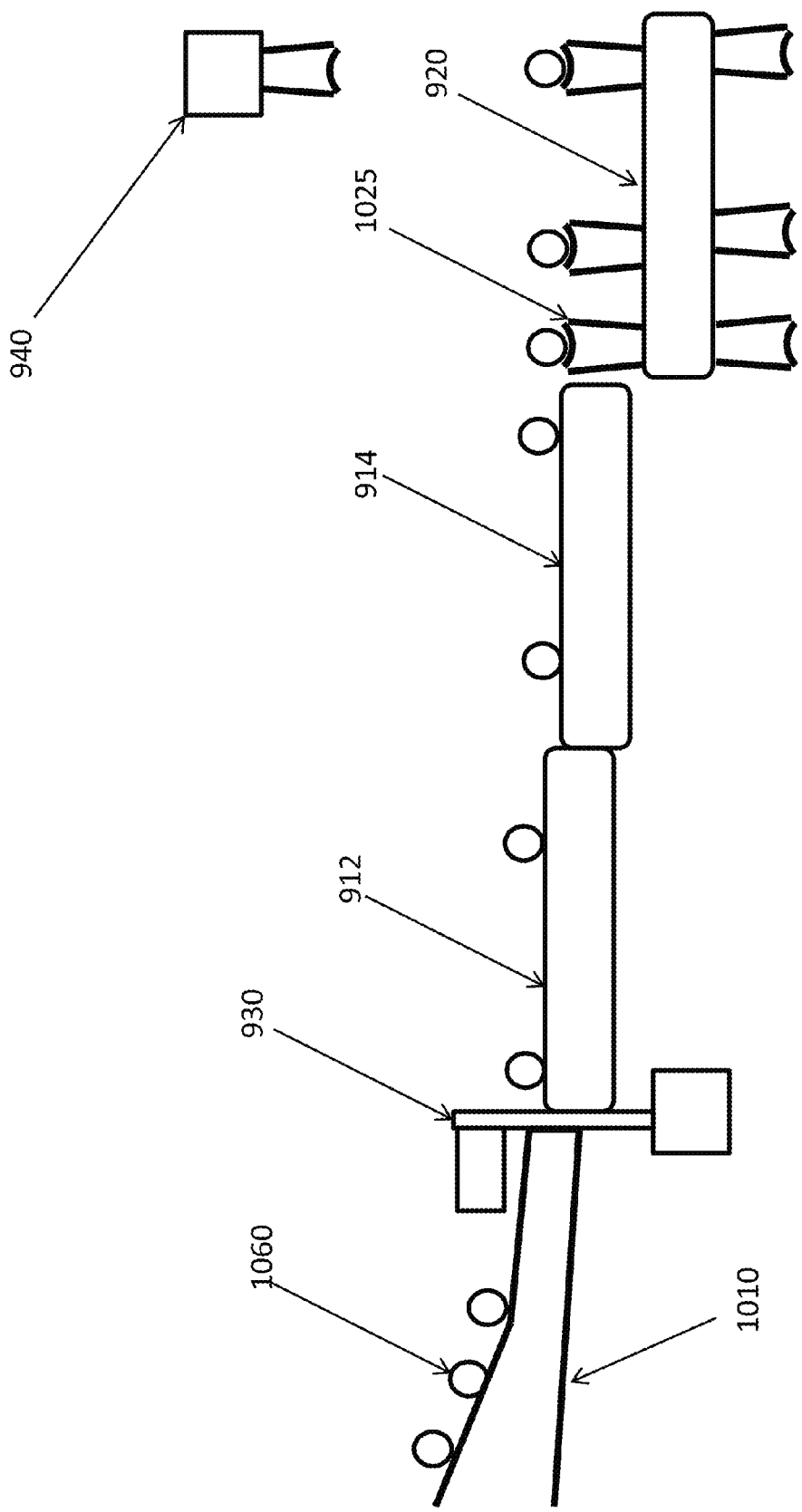
FIG. 10 shows a side view of an article carrier apparatus according to a further embodiment.

A side view of a carrier lane of FIG. 9 is shown in FIG. 10 and includes a diverter 930, a singulation apparatus 912, a load belt 914, and an article carrier 922 having a number of cups 1025. Each carrier lane may include a respective sensor 940 such a camera. The carrier lanes will be fed from an intray 1010 which has a non-uniform and dynamically varying distribution of incoming articles 1060 which are fed into the available parallel carrier lanes.

A controller 950 controls the positions of the diverters 930 dependent on sensed or determined capacity use parameters of the various carrier lanes. In this embodiment the controller is further dependent on a difference (or error) between an accumulation or combination of capacity use parameters for a plurality of the carrier lanes compared with a target accumulated or combination of capacity use parameters for those lanes. By looking at a combination of lanes rather than individual lanes the diverters act together in order to distribute incoming articles evenly across all of the carrier lanes. Thus for example even if one carrier lane is at its target amount of carried articles, the diverters either side of this carrier lane may be adjusted left or right if lanes either side of this are currently operating above or below their targets. Thus the diverters operate in concert and are affected by a plurality of carrier lanes rather than just those to which they are adjacent. This improves the stability of the system, its distribution efficiency, and its responsiveness to changes in the incoming distribution of articles thus for example the diverters can still adapt to static but non-uniform distributions of incoming articles.

Referring to FIG. 7, a flow chart for a control system loop method is shown. At step 705, the control system loop method waits for the next control cycle timer to elapse. A typical timer value is 30 seconds and provides that the dynamic fruit load of the article carrier apparatus is checked periodically. Once the current timer elapses, the method calculates diverter positions at step 710. This step will be described in more detail below with respect to FIG. 8. Once initial diverter positions are calculated, the method determines whether any of these calculated diverter positions would result in the diverter being in excess of its maximum possible physical position at step 715—typically a maximum left or right rotation. If this is not the case, then the calculated diverter positions are applied to the respective diverters at step 730, and the method returns to the waiting step 705. However if any of the calculated diverter positions are determined to exceed a maximum allowable position then the carrier lanes are split into lane groups to the left and right of the over-max diverters.

Figure 11:
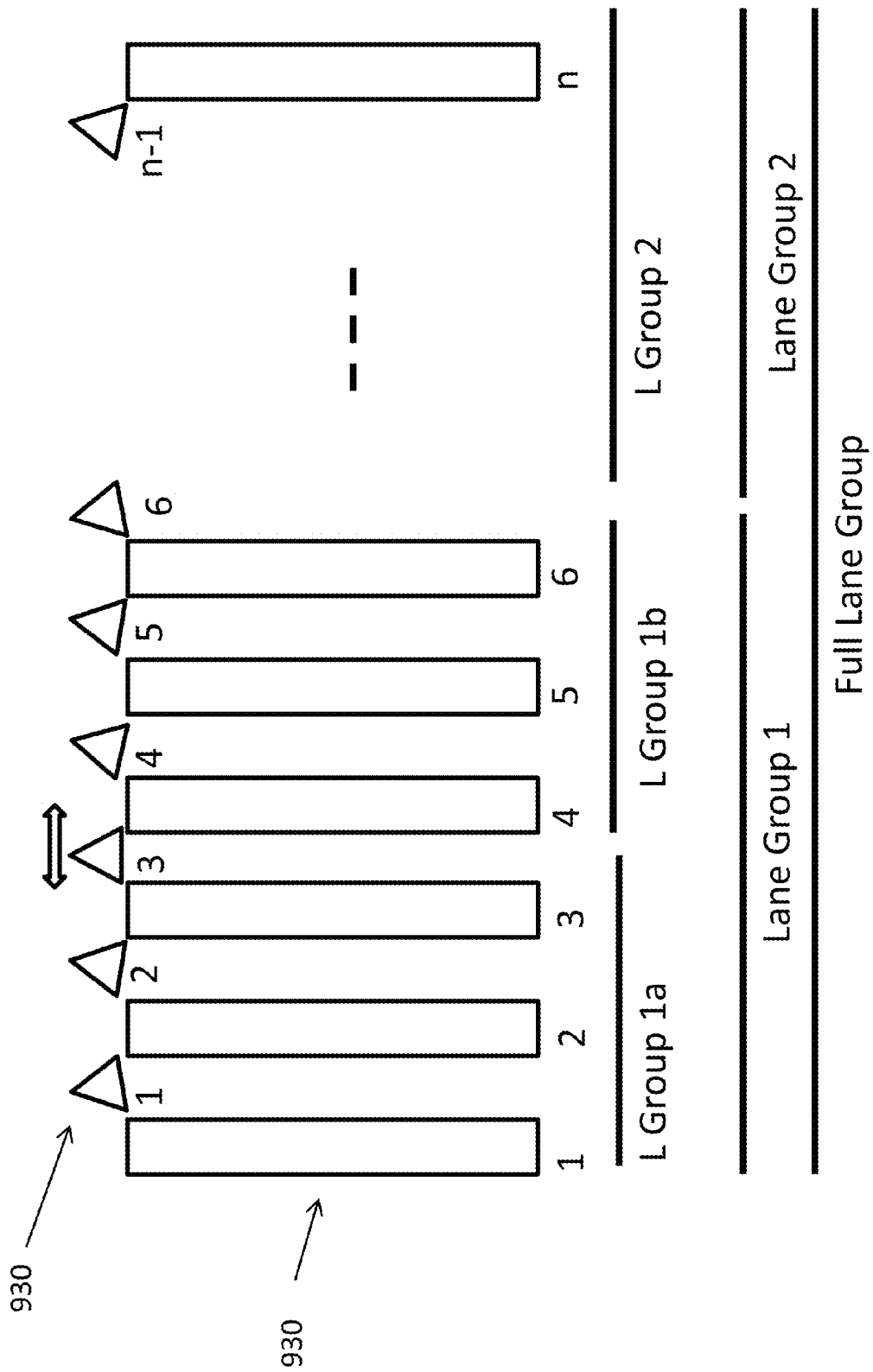
FIG. 11 is a schematic illustrating lane groups according to a further embodiment.

This lane group split or allocation is performed at step 720 and illustrated in FIG. 11. Splitting the diverter control into lane groups allows the diverters in one lane group to be targeted or balanced together whilst other diverters in a different lane group (or groups) are controlled differently. This allows the system to adapt to large distribution differences across the incoming lanes whilst maintaining stability. This also means that lanes receiving the highest flow of fruit have these distributed evenly amongst themselves taking into account the limitations of the diverters length and maximum angle. One of the results in this embodiment is to bring the maximum volume of any single lane in the group as low as possible. If just one lane in the group is at maximum capacity (even though on average the lanes are at 60% capacity), then the flow of the infeed cannot be increased. However if the method balances the volume over all lanes to 60% capacity per lane, then the infeed rate can be increased by 66%. The optimum solution is where all lane volumes are equal, but due to the limitations of the diverters, and typical distributions of the fruit, in most cases it is not possible to achieve this. An advantage is therefor to get an even distribution between the highest volume lanes in order to bring the maximum measured volume down (for these high volume lanes). Balancing the lower-volume lane groups can also be implemented to ensure even wear-and-tear, although this does not contribute to decreasing the maximum volume of any single lane. Thus the method aims to increase infeed flow rate by adjusting fruit distribution between lanes—and especially to redistribute fruit away from high capacity lanes in order to increase overall capacity of the apparatus.

The example apparatus of FIG. 9 comprises n carrier lanes and n—1 diverters initially allocated in a full or single lane group. When performing the initial calculate diverter positions step (710) it is determined that diverter 6 is over maximum and so two lane groups are allocated on either side of diverter 6—lane group 1 and lane group 2. Diverter 6 is maintained at its maximum position and the remaining diverter positions are then recalculated within each lane group. If more than one over-maximum diverter is determined, then the diverter with the largest value is used for the lane group split.

If following the diverter re-calculation step one or more over maximum diverters are detected within one or more lane groups, then the lane groups are further split into additional sub lane groups split at the highest over-maximum value diverters. In the example shown, diverter 6 is initially at over maximum so that the full lane group is split into lane groups 1 and 2. The diverter positions are then recalculated for each lane group. No over maximum diverters are determined for lane group 2 and so these diverter positions can be applied to the actual diverters. When performing the diverter calculation for lane group 1 however, it is determined that diverter 3 is now over-maximum. Therefore lane group 1 is further split into lane groups 1a and 1b on either side of diverter 3 and diverter positions are re-calculated within each lane group (1a and 1b). Once no further over-maximum diverters are determined, the calculated diverter positions can be applied to the actual diverters.

Referring back to FIGS. 7 and 8, for each lane group to the left or right of the over over-maximum diverter, the control method determines at step 725 whether each lane group to the left or right has only one lane, and if so the calculated diverter positions are applied for that one lane group. The remaining lane groups (i.e. those with two or more lanes) have diverter positions recalculated at step 710. The method continues iteratively until there are no diverters at over maximum values. At this point all the latest calculated diverter positions are applied to the diverters in the apparatus at step 730. The method then returns to the next control cycle.

The calculating position process for each diverter is illustrated in FIG. 8. In this embodiment a sensor or camera 805 is provided for each lane 1-n. The sensors provide capacity use parameter data for each lane, for example the number or count of articles over a ten second period or the lane cupful over a same or different time period for example. This data is provided to calculate combined actual 810 and calculate combined target 815 processes.

The calculate actual process 810 for each diverter combines all of the capacity use parameter or count data for each lane to the left of the diverter in order to generate a combined determined capacity use parameter. This procedure is illustrated in FIG. 12 which shows a five lane apparatus in which the lanes have capacity use parameters or counts of respectively: five (lane 1); ten (2); thirty (3); forty (4); fifteen (5). The actual accumulated counts associated with diverters to the right of the lanes are respectively: five (diverter 1); fifteen (2); forty five (3); eighty five (4).

The calculate target process 815 determines the combined target capacity use parameter for lanes to one side of the diverter (in this case to the left). The target for each lane will be the total count of all lanes divided by the total number of lanes, and then multiplied by the number of lanes to the left of the diverter in question. In other words the target is the lane count of cupfill were the distribution of articles across the lanes even.

In this particular embodiment the calculations are performed using lanes to the left of the current diverter, however in an alternative embodiment lanes to the right could be used. For this embodiment the following calculations may be used:

Actual (diverter m)=sum of lane counts 1–m (i.e. all lanes to the left of diverter (m)

Target (diverter m)=article count of all lanes multiplied by lanes to the left of current diverter (m) divided by total number of lanes $$\text{Difference}=\text{target}-\text{actual (for each diverter)}.$$

The difference or error signal between the target and actual values is then determined by a summing process 820 and which is then feed through a PID (proportional and/or integral and/or differential) control process in order to determine an adjustment for the diverter in question. The proportional multiplier 825 may be determined by trial and error and will depend on the transport delay between the sensor position and the diverter position. An integral factor 830 may additionally be used especially where the distribution of the incoming articles is unlikely to change significantly and therefore the diverter positions should not divert unduly from their mean positions. The integral factor is useful when the measured value is approaching the target but the proportional factor is too small to drive the output. The integral factor will accumulate all the past errors, driving the output towards the target. Conversely a differential factor 835 may be used to prevent over-shooting the target where a high variation in incoming article distribution is expected. The differential factor has the effect of driving the output in the opposite direction that it is changing. If the actual value is rapidly approaching the target, the correctly defined differential factor will compensate and prevent overshoot by driving the output against the direction of change. The various processed error signals are then summed at 340 to generate a positive or negative diverter adjustment to apply to the current diverter position. This calculation is performed for each diverter m=1 through to n−1.

Where a lane group split has occurred, these diverter calculations are performed within each lane group. Thus for example left in the two lane group of FIG. 12, the total count for both lanes is 22, and therefore the target for each lane is 11. Therefore the target for the controllable diverter is the accumulated lane targets to the left—in this case 11. Similarly for the three lane group to the right of the maximum diverter, the total count is 30+28+20=78, which is divided by the total number of lanes in the lane group (i.e., 3) in order to provide a target of 26 for each of the three lanes. Thus the accumulated target used by the method is 26 for the first diverter in this lane group, and 52 for the second diverter in this lane group. The combined target and combined actual values are then used in order to determine a difference or error value for each diverter as described above. A suitable PID adjustment may then be performed in order to generate a final adjustment for each diverter in the lane group. These diverter adjustment calculations are performed for each diverter within each lane group.

Although the embodiment of FIGS. 7-12 has been described separately various aspects of this could be combined with the earlier embodiments, for example this method could be applied to the simpler lane construction of FIG. 1—and vice versa. Similarly some elements of the methods could be combined.

Unless the context clearly requires otherwise, throughout the description and the claims, the words "comprise", "comprising", and like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention.

Any methods here disclosed or claimed may be implemented using a computer program product which when implemented on a computer causes the computer to execute the methods. Such a computer and/or computer program product may be implemented by any suitable processor and computer program, for example a general purpose processor and computer code instructions on a memory device CD ROM or the like or a downloaded file, a digital signal processor, ASIC or FPGA for example.

The embodiments of the invention in which an exclusive property or privilege is claimed are defined as follows:

1. An article carrying apparatus comprising:
   a plurality of parallel carrier lanes each for receiving and conveying a number of articles, each of the plurality of carrier lanes having an input channel;
   a number of diverters each located between receiving ends of respective carrier lanes and arranged to control the distribution of received articles into the lanes;
   one or more sensors arranged to determine a capacity use parameter for each lane; and
   a controller arranged to control the position of a diverter dependent on a difference between combined determined capacity use parameters and combined target capacity use parameters for lanes to one side of the diverter, wherein each diverter is controlled to increase or decrease a size of an input channel of a carrier lane.

2. The article carrying apparatus according to claim 1, wherein the combined target capacity use parameter comprises the combined capacity use parameters for all lanes multiplied by the number of lanes to the one side of the diverter, and divided by the total number of lanes.

3. The article carrying apparatus according to claim 1, wherein the plurality of carrier lanes are divided into two lane groups at the diverter which is disabled or at a maximum position; and
   for each lane group the controller is arranged to control the position of a diverter dependent on a difference between combined determined capacity use parameters and combined target capacity use parameters for lanes within the lane group to the left or right of the diverter.

4. The article carrying apparatus according to claim 1, wherein the capacity use parameter is one or more of the following: cupfill and count of articles over a predetermined period.

5. The article carrying apparatus according to claim 1, wherein the carrier lanes comprise one or a combination of: a carrier for carrying articles individually, a singulation apparatus, and a load belt.

6. The apparatus according to claim 1, wherein
   each carrier lane comprises an article carrier having a plurality of cups each for receiving an item; and
   the capacity use parameter is the cupfill of the respective carrier lane.

7. The apparatus according to claim 1, wherein the sensor comprises one or more cameras arranged to view carried articles on each respective carrier lanes.

8. The apparatus according to claim 1, further comprising an infeed tray located adjacent or arranged to incorporate the diverters.

9. The apparatus according to claim 1, wherein the controller is arranged to control the position of a diverter according to a signal derived from the difference between combined determined capacity use parameters and combined target capacity use parameters for lanes to one side of the diverter, the signal being processed using one or a combination of: a proportional operation; an integral operation; a differential operation.

10. A controller for an item carrying apparatus, comprising:
 a plurality of parallel carrier lanes each for receiving and conveying a number of articles, each of the plurality of carrier lanes having an input channel;
 a number of diverters each located between receiving ends of respective carrier lanes and arranged to control the distribution of received articles into the lanes; and
 one or more sensors arranged to determine a capacity use parameter for each lane,
 wherein the controller is arranged to control the position of a diverter dependent on a difference between combined determined capacity use parameters and combined target capacity use parameters for lanes to one side of the diverter, wherein each diverter is controlled by the controller to increase or decrease a size of an input channel of a carrier lane.

11. A method of operating an article carrying apparatus having a plurality of parallel carrier lanes each for receiving and conveying a number of articles, a number of diverters each located between receiving ends of respective carrier lanes and arranged to control the distribution of received articles into the lanes, and one or more sensors, the method comprising:
 determining a capacity use parameter for each lane using the sensors; and
 controlling the position of a diverter dependent on a difference between combined determined capacity use parameters and combined target capacity use parameters for lanes to one side of the diverter.

12. The method according to claim 11, wherein the combined target capacity use parameter comprises the combined capacity use parameters for all lanes multiplied by the number of lanes to the one side of the diverter, and divided by the total number of lanes.

13. The method according to claim 11, further comprising:
 dividing the plurality of carrier lanes into two lane groups at the diverter which is disabled or at a maximum position; and
 controlling the position of a diverter dependent on a difference between combined determined capacity use parameters and combined target capacity use parameters for lanes within the lane group to the left or right of the diverter.

14. The method according to claim 11, wherein the capacity use parameter is one or more of the following: cupfill and count of articles over a predetermined period.

15. The method according to claim 11, further controlling the position of the diverter dependent on a signal derived from the difference between combined determined capacity use parameters and combined target capacity use parameters for lanes to one side of the diverter, wherein the signal is processed using at least one of: a proportional operation, an integral operation, and a differential operation.

16. A system for grading product using an article carrying apparatus, comprising:
 a plurality of parallel carrier lanes each for receiving and conveying a number of articles, each of the plurality of carrier lanes having an input channel;
 at least one diverter located between receiving ends of respective carrier lanes and arranged to control the distribution of received articles into the lanes;
 at least one sensors; and
 a computer system configured to control the position of the at least one diverter, the computer system comprising:
  a memory; and
  a controller stored on the memory and that is configured, when executed, to:
   determine a capacity use parameter for each lane using the sensors; and
   control the position of a diverter dependent on a difference between combined determined capacity use parameters and combined target capacity use parameters for lanes to one side of the diverter, wherein each diverter is controlled to increase or decrease a size of an input channel of a carrier lane.

* * * * *

UNITED STATES PATENT AND TRADEMARK OFFICE
CERTIFICATE OF CORRECTION

PATENT NO. : 9,533,837 B2
APPLICATION NO. : 14/576003
DATED : January 3, 2017
INVENTOR(S) : Andrew Stitt et al.

It is certified that error appears in the above-identified patent and that said Letters Patent is hereby corrected as shown below:

In the Claims

In Column 12, Line 38 (Claim 3), begin a new subparagraph with a hanging indent after "wherein".
In Column 14, Line 26 (Claim 16), "sensors" should be --sensor--.

Signed and Sealed this
Fourteenth Day of March, 2017

Michelle K. Lee
*Director of the United States Patent and Trademark Office*